Jan. 3, 1956  G. A. MONTOOTH  2,729,449
PIN SETTING APPARATUS FOR BOWLING ALLEYS
Filed Jan. 14, 1948  12 Sheets-Sheet 2

Inventor:
George A. Montooth.
By [signature]
Attorney.

Jan. 3, 1956  G. A. MONTOOTH  2,729,449
PIN SETTING APPARATUS FOR BOWLING ALLEYS
Filed Jan. 14, 1948  12 Sheets-Sheet 3

Jan. 3, 1956  G. A. MONTOOTH  2,729,449
PIN SETTING APPARATUS FOR BOWLING ALLEYS
Filed Jan. 14, 1948  12 Sheets-Sheet 5

Inventor:
George A. Montooth
By [signature]
Attorney.

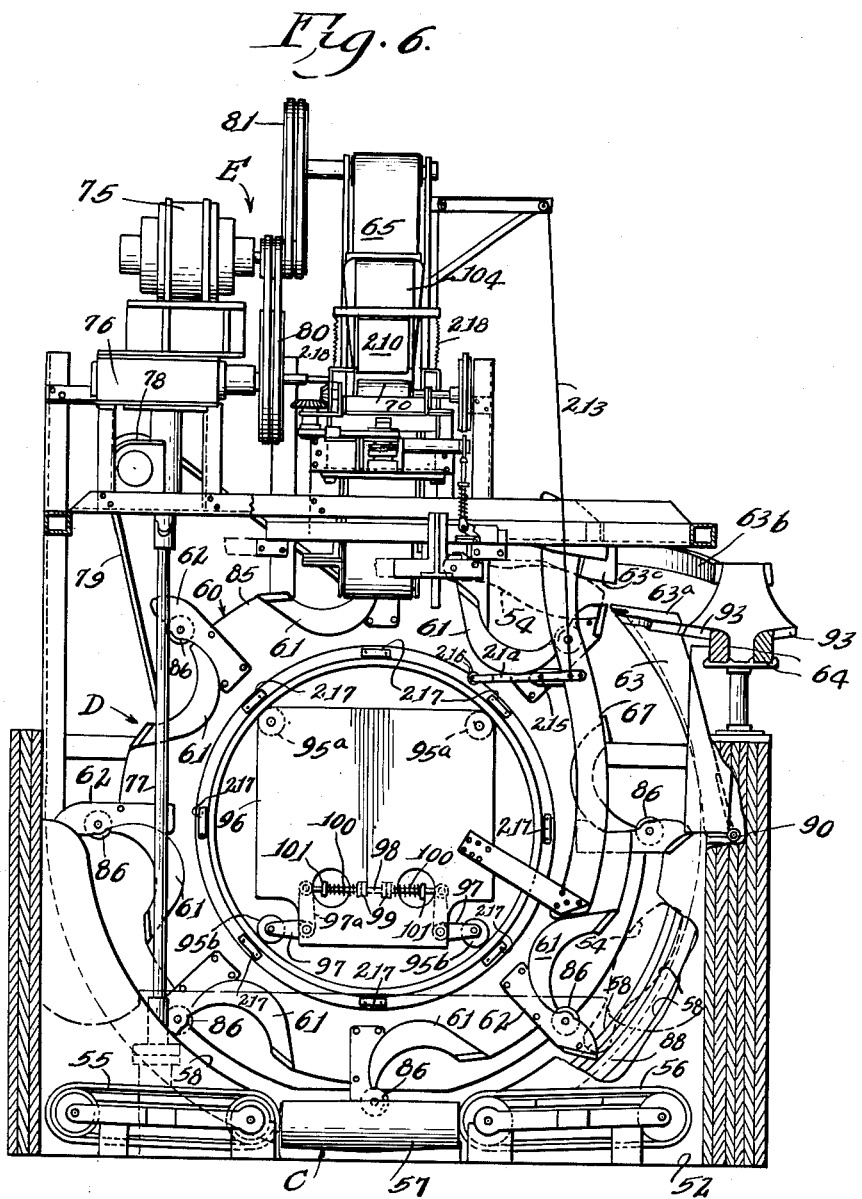

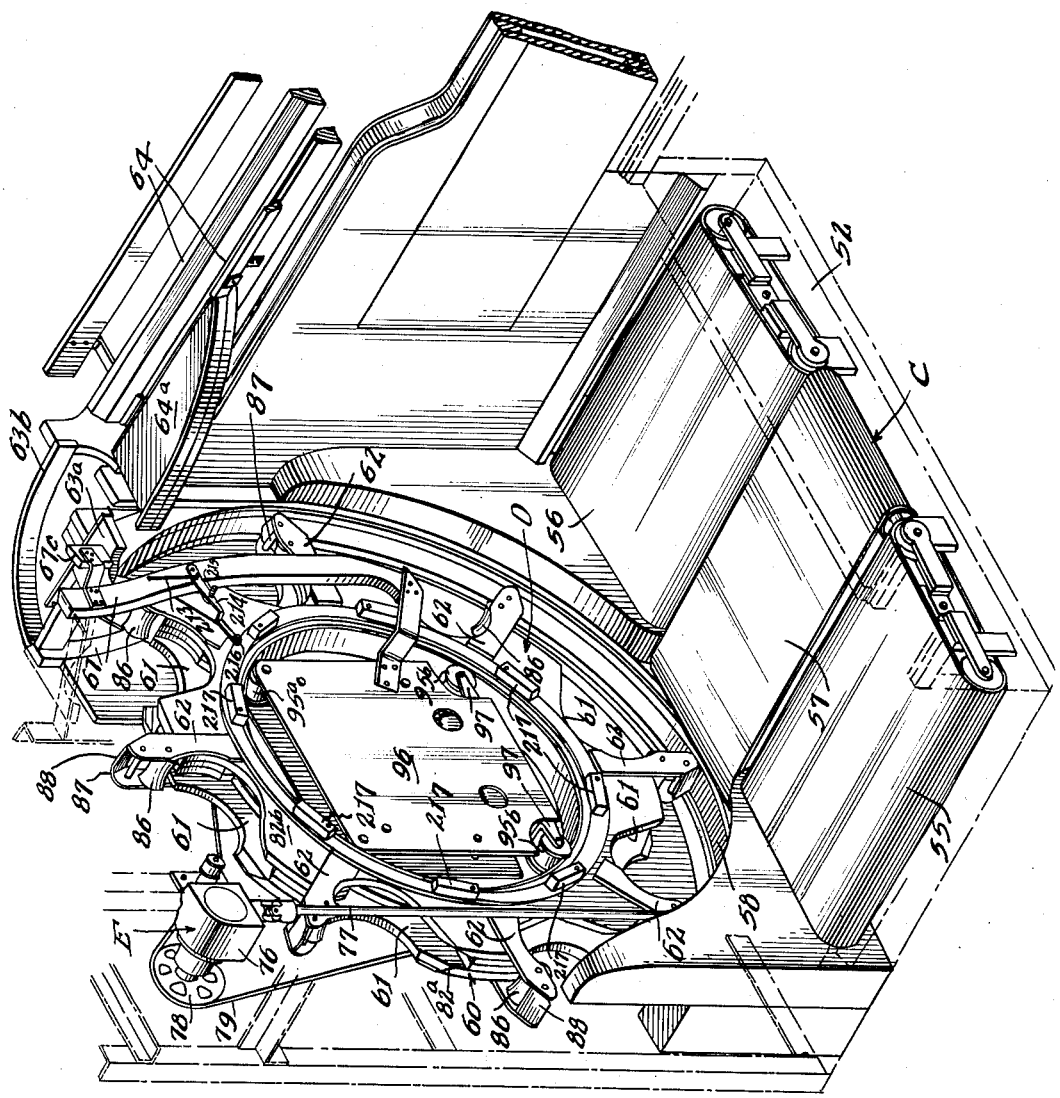

Jan. 3, 1956  G. A. MONTOOTH  2,729,449
PIN SETTING APPARATUS FOR BOWLING ALLEYS
Filed Jan. 14, 1948  12 Sheets-Sheet 8
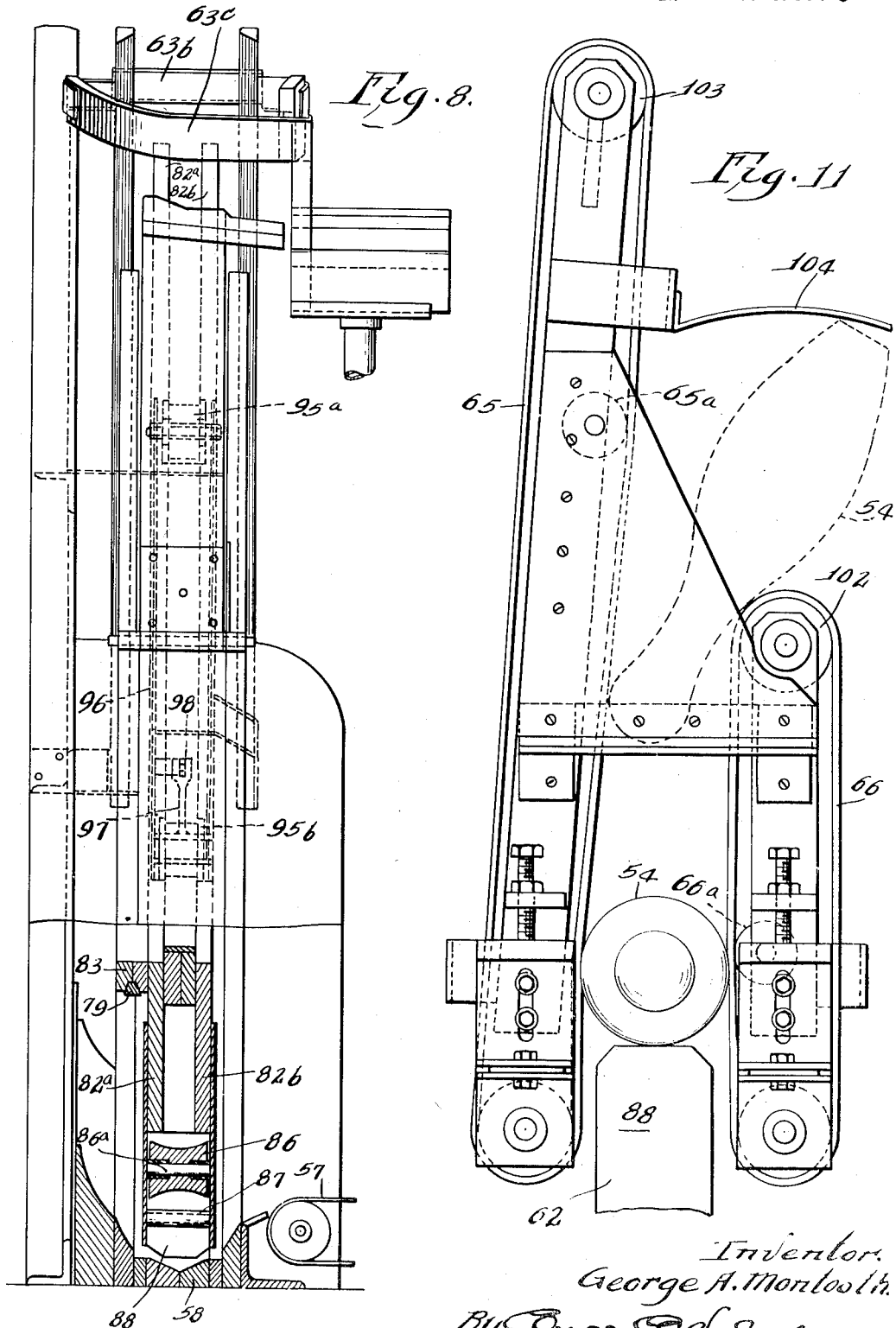
Inventor.
George A. Montooth
By [signature]
Attorney.

Jan. 3, 1956  G. A. MONTOOTH  2,729,449
PIN SETTING APPARATUS FOR BOWLING ALLEYS
Filed Jan. 14, 1948  12 Sheets—Sheet 9
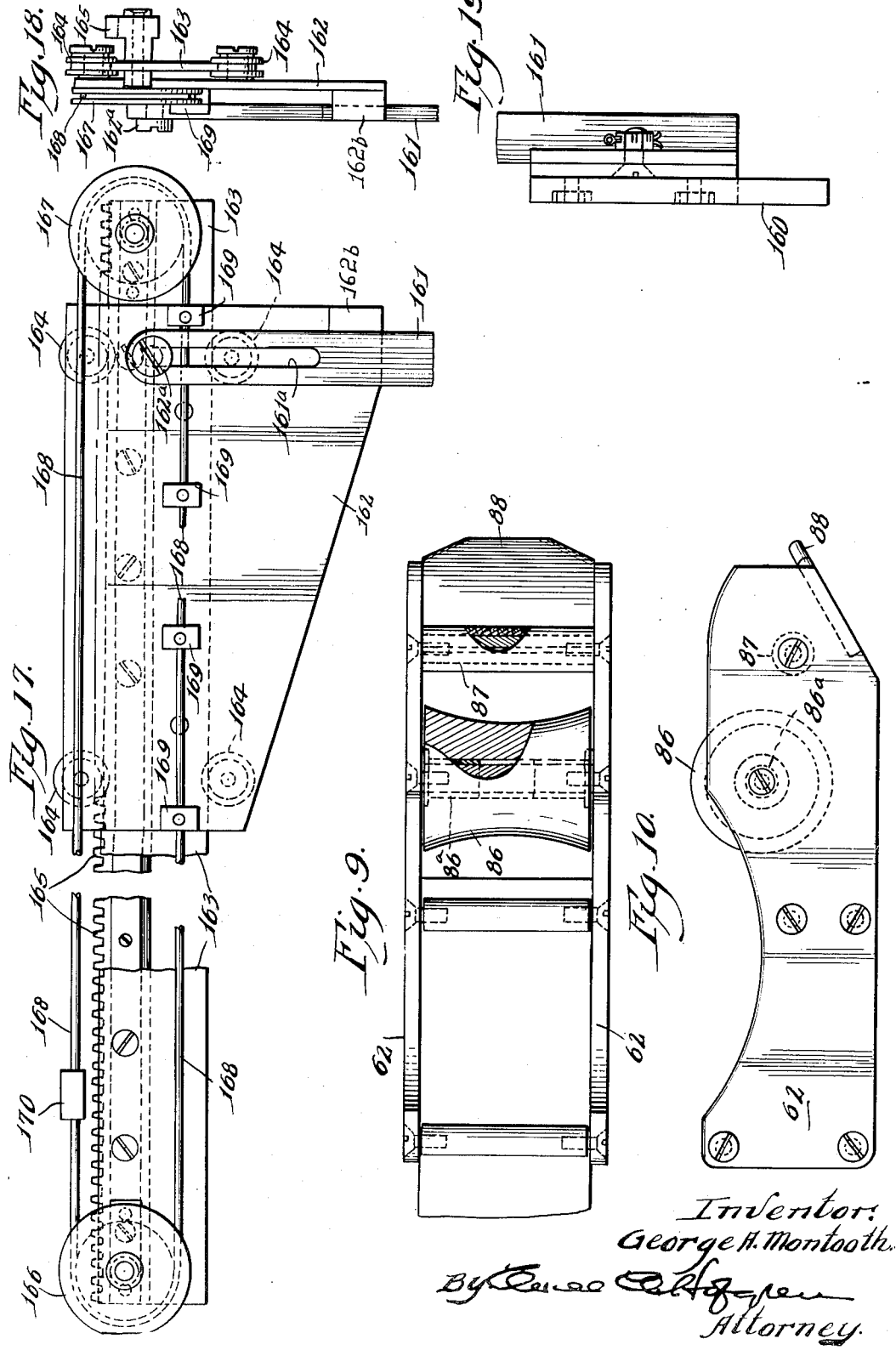
Inventor:
George A. Montooth
By [signature]
Attorney.

Jan. 3, 1956
G. A. MONTOOTH
2,729,449
PIN SETTING APPARATUS FOR BOWLING ALLEYS
Filed Jan. 14, 1948
12 Sheets-Sheet 10
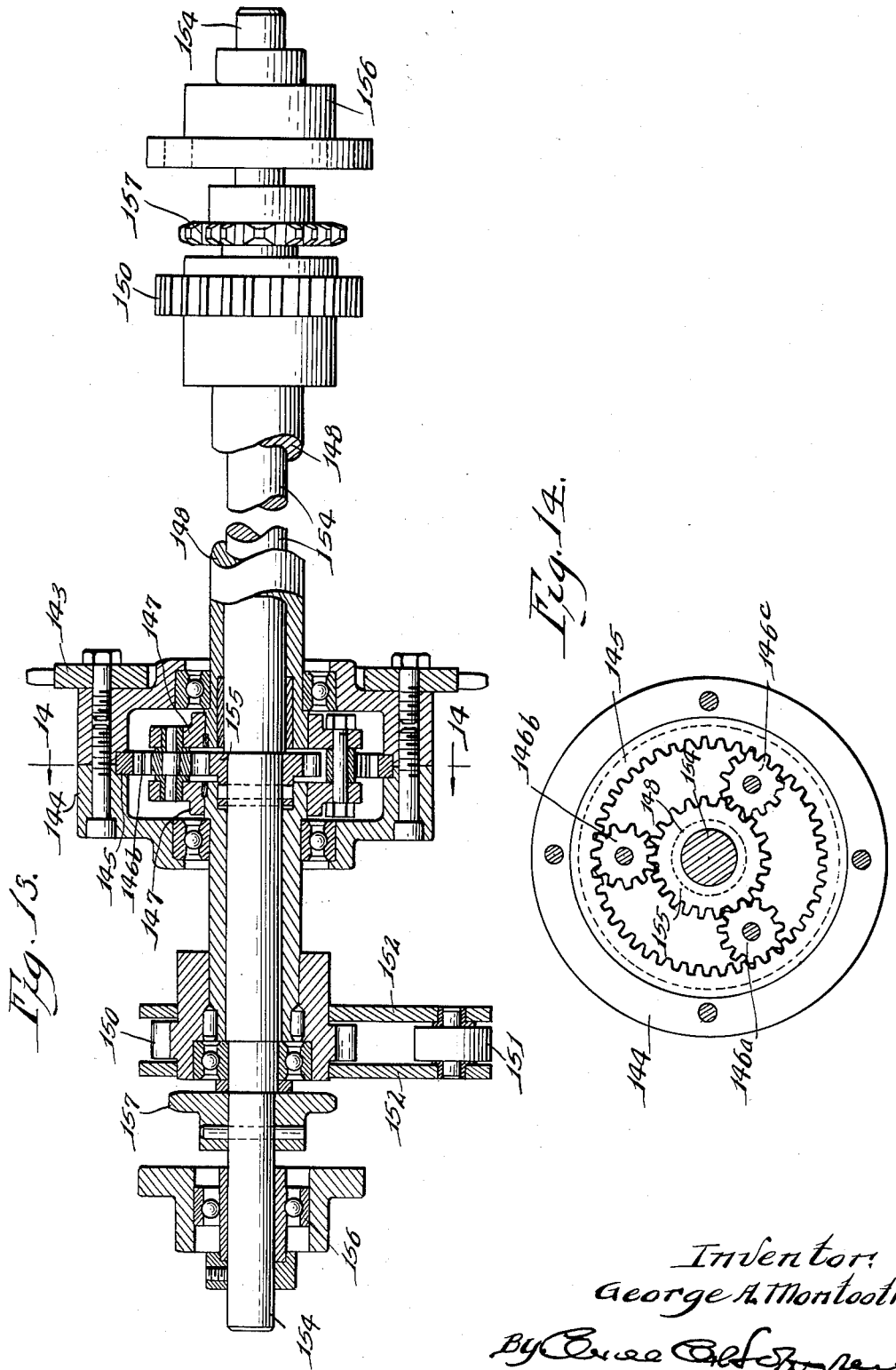
Inventor:
George A. Montooth,
By [signature]
Attorney.

Jan. 3, 1956  G. A. MONTOOTH  2,729,449
PIN SETTING APPARATUS FOR BOWLING ALLEYS
Filed Jan. 14, 1948  12 Sheets-Sheet 11
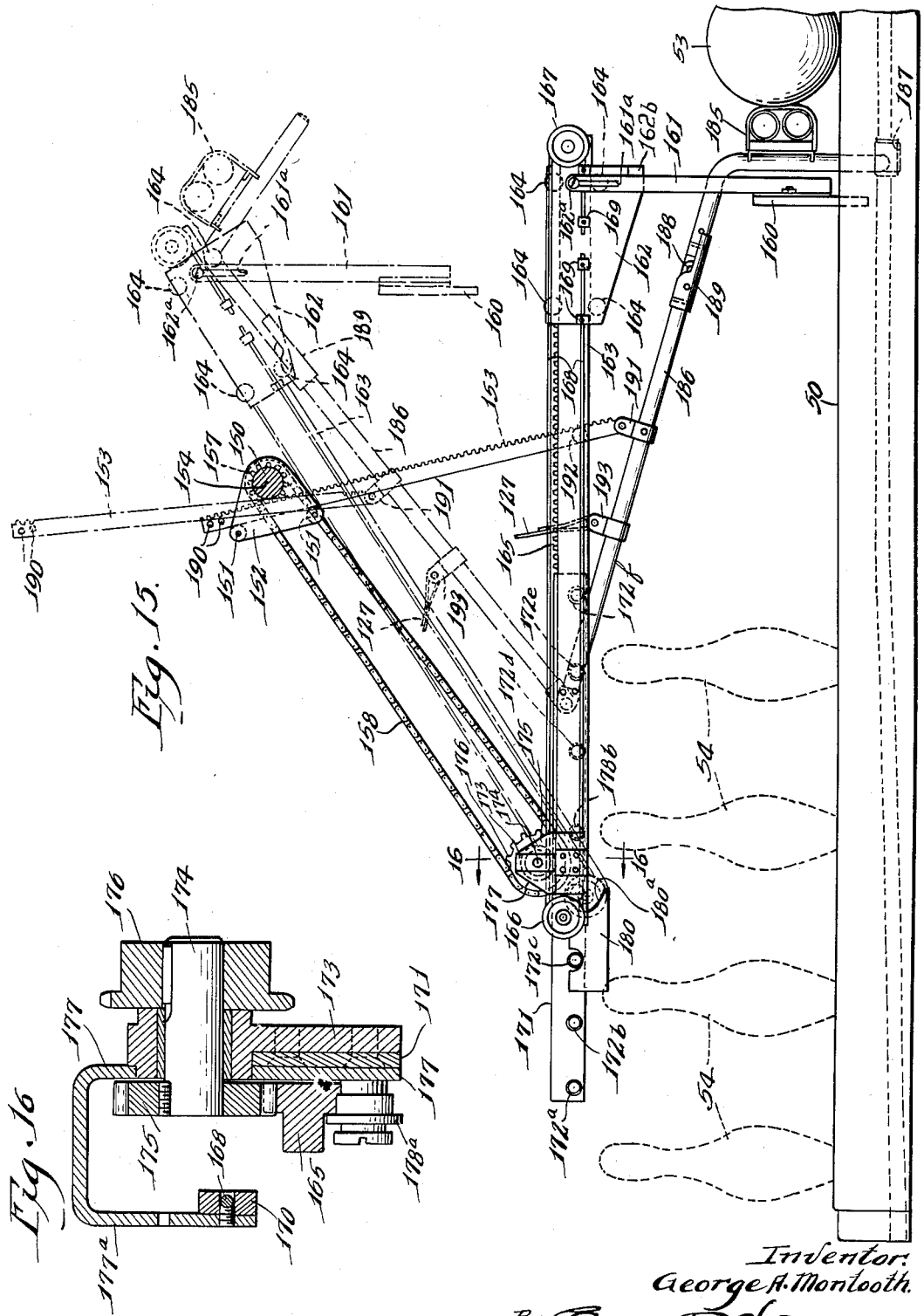
Inventor:
George A. Montooth.
By [signature]
Attorney.

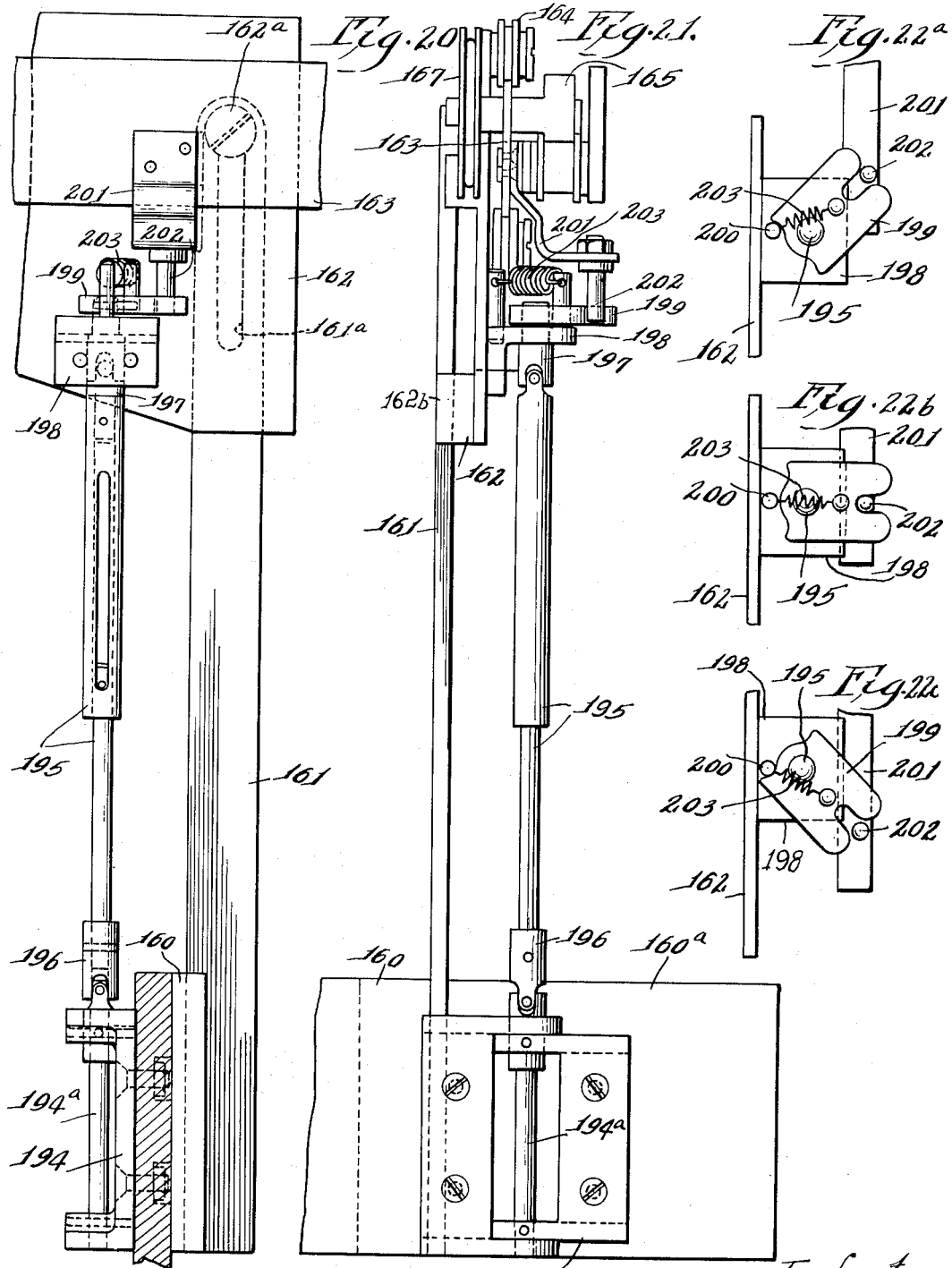

United States Patent Office 2,729,449
Patented Jan. 3, 1956

2,729,449
PIN SETTING APPARATUS FOR BOWLING ALLEYS

George A. Montooth, Long Beach, Calif., assignor to The Brunswick-Balke-Collender Company, Chicago, Ill., a corporation of Delaware Application January 14, 1948, Serial No. 2,205

7 Claims. (Cl. 273—43)

This invention relates to a pin setting machine, and more particularly to a pin setting machine having novel ball and pin gathering means.

An object of this invention is to provide in a pin setting machine for use with an alley bed having a pin deck and a pit at the rear thereof, ball and pin gathering apparatus comprising a movable pit cushion, means for moving said cushion out of the way to permit said ball and pins to pass thereunder and to the rear thereof, and means for moving said ball and pins to the rear of said cushion.

Another object is to provide means for gathering pins from the pin deck and pit and improved means for preventing a ball from injuring the pin gathering mechanisms, comprising a guard normally located above the alley bed and movable to a position on the alley bed adjacent the front of the pin deck in the path of a rolled ball for preventing balls from striking the mechanisms, and a movable pit cushion, said cushion being vertically suspended in the pit of the bowling alley and normally extending transversely across said pit in the path of the ball and pins, said cushion being elevated as a function of the lowering of said guard to permit said ball and pins to pass beneath said cushion and to the rear thereof.

Another object is to provide a pin setter with sweep and guard means, a swinging pit cushion and novel means for raising and lowering such pit cushion as a function of the operation of the sweep and guard means.

Another object is to provide pin gathering means including a novel sweep and guard mechanism comprising a pivotally mounted guard normally located above the alley bed and adapted to be lowered across the alley bed adjacent the front of the pin deck after a ball has been rolled to protect the machine mechanisms from improperly rolled balls, and a sweep member normally located above the alley bed and carried down to the alley bed with said guard, a tiltable track along which said sweep member may run to the rear of said alley bed, and a single operating means for operating said sweep and guard both downwardly and forwardly and rearwardly and upwardly.

Another object of this invention is to provide a novel sweep mechanism for gathering pins, including a sweep member movable from an upper rest position above the alley bed to a lower operative position adjacent the alley bed, said member, when in said rest position being movable from a front position to a rear position on the alley bed, said sweep member extending substantially across the alley and the gutters associated therewith when said member is moving to or from said rear position, together with means for decreasing the length of said sweep member as said member approaches its front position in order to provide clearance for the return of bowling balls above the sides of said alley as the sweep is moved to its rest position.

Other objects and advantages will be apparent from the following detailed description taken in connection with the accompanying drawings, in which:

Fig. 6 is a transverse vertical section through the machine taken at the rear of the alley bed and looking toward the rear of said machine, with the swinging pit cushion removed;

Fig. 7 is an isometric view of the pit with the swinging pit cushion and its associated structure removed;

Fig. 8 is an enlarged vertical section through the sorter wheel;

Fig. 9 is an enlarged plan, partly in section, of one of the ball and pin carrying paddles of the sorter wheel;

Fig. 10 is an elevational view of the paddle of Fig. 9;

Fig. 11 is an enlarged view of the vertical conveyors which remove pins from the sorter wheel;

Fig. 12 is a perspective view, partly in section, of the swinging pit cushion;

Fig. 13 is a view, partly in section and partly in elevation, of a portion of the planetary gear assembly which operates the guard and sweep;

Fig. 14 is a vertical section through the planetary gear assembly of Fig. 13 taken on the line 14—14 of such figure;

Fig. 15 is an assembly view of the sweep and guard apparatus in rest position in broken lines and in operative position in full lines;

Fig. 16 is an enlarged vertical section along the line 16—16 of Fig. 15;

Fig. 17 is an enlarged view, partly broken away, of a portion of the sweep mechanism;

Fig. 18 is an end view of the apparatus of Fig. 17;

Fig. 19 is an enlarged fragmentary view showing the connection of the sweep member to the supporting arms;

Fig. 20 is a fragmentary view showing the operating mechanisms of a modified form of sweep mechanism looking from the right of Fig. 21;

Fig. 21 is a front view of the apparatus of Fig. 20; and

Figs. 22a, 22b and 22c are fragmentary bottom plan views of a portion of the actuating apparatus of Fig. 20 in different operating positions.

Figure 1:
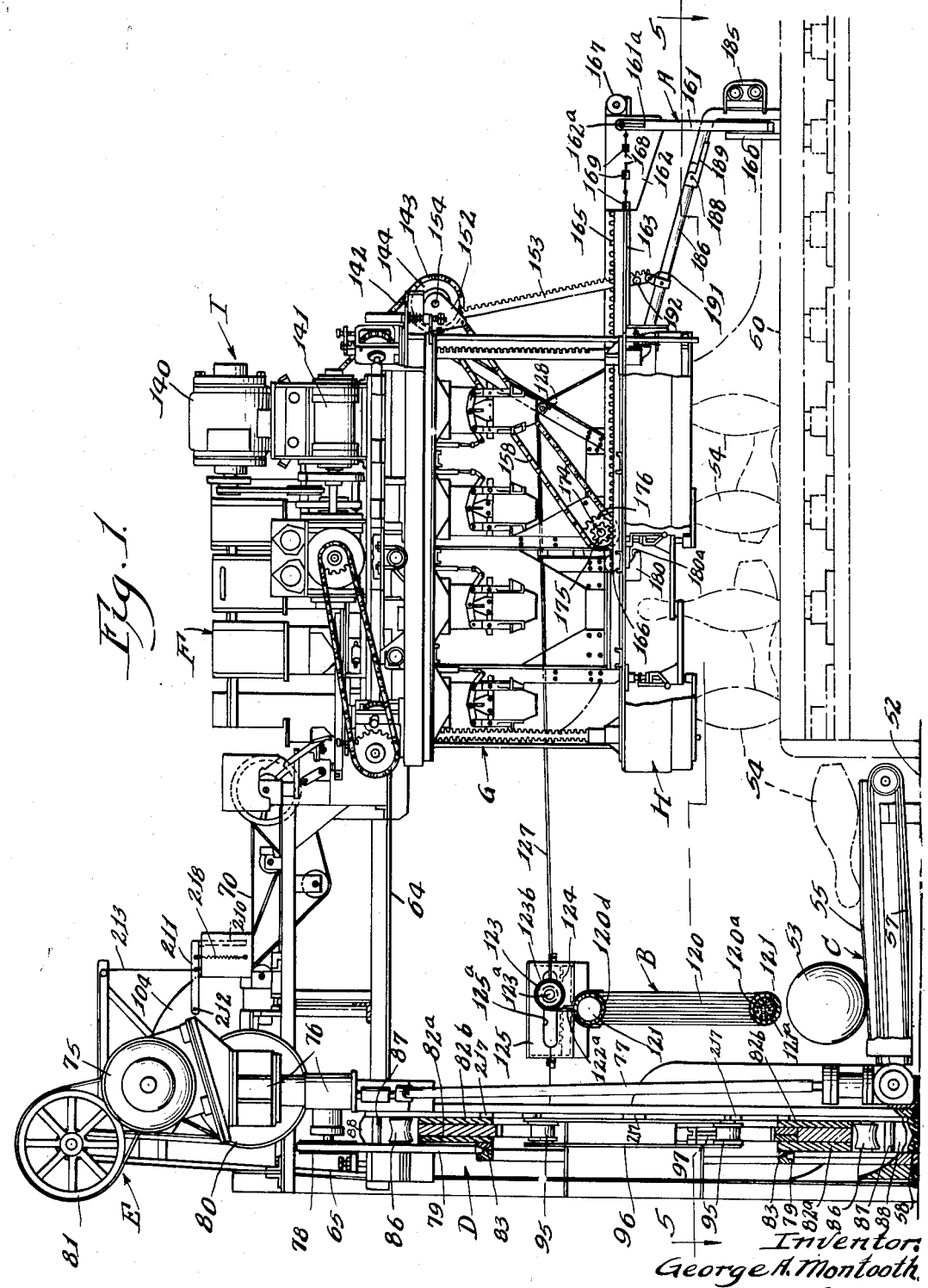
Fig. 1 is a side view, partly in section and partly in elevation, of a pin setting machine constructed in accordance with my invention.

While the invention is susceptible of embodiment in many different forms, there are shown in the drawings and will herein be described in detail two specific embodiments, with the understanding that the present disclosure is to be considered as an exemplification of the principles of the invention and is not intended to limit the invention to the embodiments illustrated. The scope of the invention will be pointed out in the appended claims.

Referring now to the drawings, the machine illustrated is adapted for use on an alley bed 50, the rear portion comprising a pin deck, said alley having conventional gutters 51 associated therewith and having at the rear thereof a conventional pit 52. Said machine comprises various ball and pin gathering mechanisms including a sweep and guard mechanism designated generally at A; a movable pit cushion which is operatively connected with the sweep and guard mechanism and is designated generally at B; a conveyor system on the floor of said pit, this conveyor system being designated generally at C and being operative to move the ball and pins which have fallen from the pin deck into the pit to the rear of said pit cushion; and a ball and pin elevating system designated generally at D, this system including means for moving the ball and pins to an elevated position behind the cushion; means for removing said ball to a ball return track; means for elevating the pins and arranging said pins in a desired manner; and means above said pit for conveying the pins across the pit to a position above the pin deck.

Means for driving the mechanisms C and D are designated generally at E, this means also serving to provide power for indexing a rotary pin arranging magazine F to which pins are fed by the gathering means above set forth. From the magazine the pins are delivered to a pin setting mechanism G which is positioned directly above the pin deck of the alley bed 50 and is operable to descend through a pin pickup mechanism H to set pins on said deck. Power to operate the sweep and guard, pin setting and pin pickup mechanisms is derived from a power arrangement I comprising a motor, a transmission and other drive connections.

Inasmuch as the complete operation and control of the machine illustrated is described in the application of George A. Montooth and William J. Schlitt, Jr., filed March 11, 1948, as Serial Number 14,358, now Patent No. 2,705,146, granted March 29, 1955, and the operation of certain of the machine mechanisms including the magazine F and the pin setting and pickup mechanisms G and H is described in detail in the application of George A. Montooth, filed March 24, 1947, as Serial Number 736,643, the complete operation of the machine will be described only briefly here to show the general coordination of the ball and pin gathering means with the balance of the machine.

Figure 2:
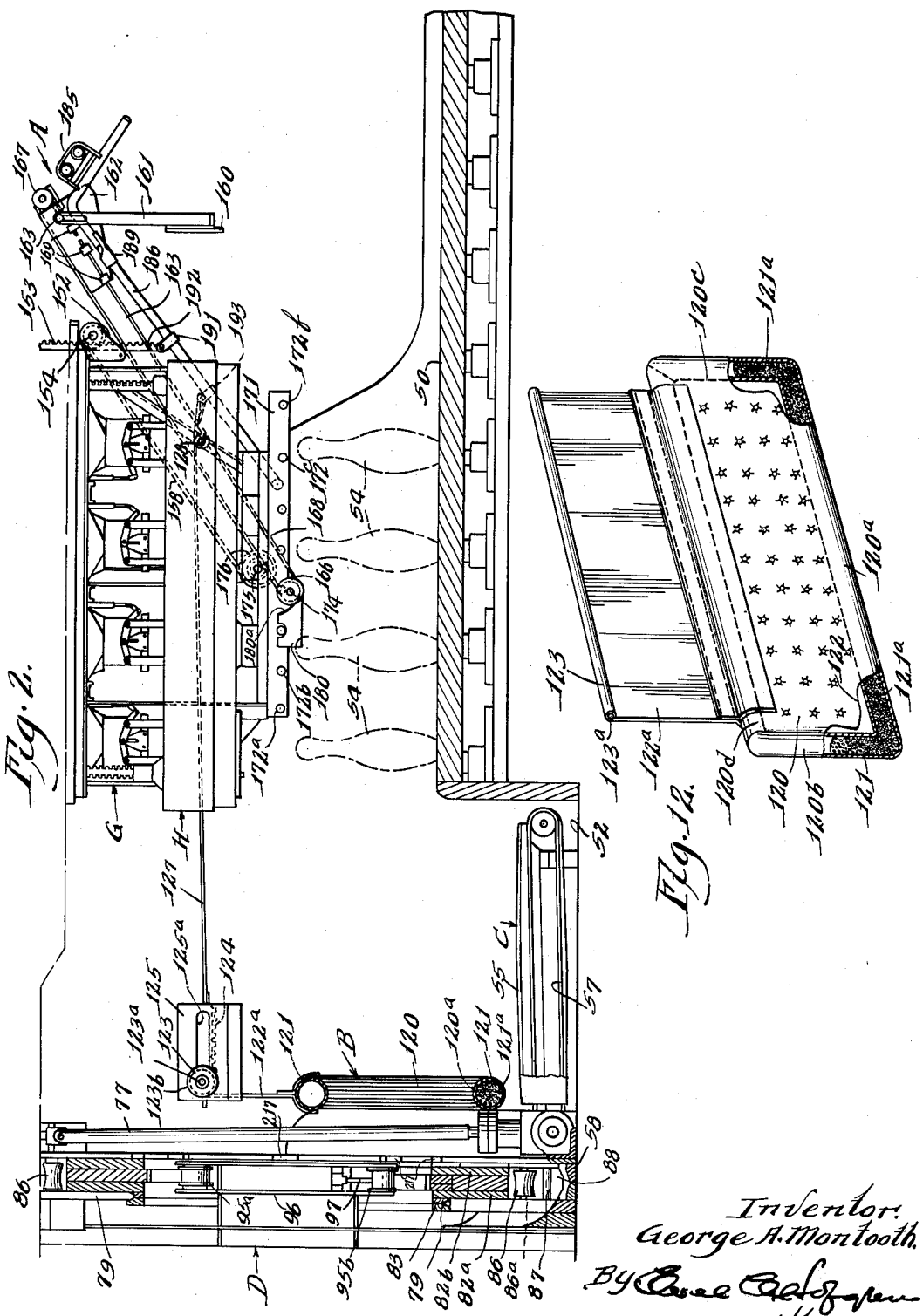
Fig. 2 is a longitudinal section showing the lower portion of the machine of Fig. 1, with certain of the parts in a different position.

The machine, as shown in Fig. 2, is in its rest position before a ball has been rolled. The sweep and guard mechanism A is in its upper rest or inoperative position; the swinging pin cushion B is in its lower position where it extends transversely across the pit in the path of the ball and pins; and the pin setting mechanism G and the pin pickup mechanism H are in their upper or rest position. In Fig. 1 the machine is shown after it has completed a portion of its cycle after the rolling of a ball 53 which has knocked down some of the pins 54, some of the fallen pins or dead wood remaining on the pin deck and some of the fallen pins having been knocked into the pit 52. At the particular point in the cycle illustrated the sweep and guard A have been lowered to their operative position, the swinging pit cushion B has been elevated to permit the passage of the ball and pins therebeneath, and the pickup mechanism H has descended and is about to pick up the standing pins so that the alley bed may be swept clear of dead wood. The cycle of operation of the machine may have been initiated in any one of a number of ways, as for example by placing one or more light beams in the path of said ball so that interruption of said light beams by the ball causes actuation of a switch to start the cycle of operation; or, preferably, in the particular machine illustrated, the cycle of operation may have been initiated by the weight of the ball in the pit, one or more switch panels 52a being positioned in the pit and being operated by the weight of the ball on the conveyor C to start a cycle of operation. In any event, once started, the machine is designed to continue its cycle of operation to pick up the standing pins, sweep the dead wood from the alley, replace the standing pins thereon, return the ball 53 to the player's end of the alley, and gather the pins from the pit preparatory to placing a new set of pins on the pin deck. After a second ball is rolled the alley is swept and a new set of pins are placed in position on the pin deck. In the event the first ball has knocked down all of the pins the pickup operation is dispensed with and the alley is swept and a new set of pins are placed in position. Should the first ball miss the pins, as by rolling down the gutter, the pins are left on the alley in readiness for the second ball. The operation of the machine through its various cycles is described in detail in the application above referred to as Serial No. 14,358.

The conveyor system C on the floor of the pit comprises a pair of endless belts 55 and 56 (see Figs. 6 and 7) extending from opposite sides of said pit and running toward the center thereof, and a third endless belt 57 extending longitudinally of said pit in the center thereof and running toward the rear of said pit. Preferably these belts are tiltable to permit access to the pit floor beneath them. The two transverse belts 55 and 56 deliver the ball and pins to the center belt 57, and said center belt carries the ball and pins beneath the swinging pit cushion B and to the rear of the pit. At the rear of the pit the ball and pins are guided by the belt 57 onto an arcuate wooden track designated at 58 and best shown in Fig. 7. This wooden track is shaped to allow either a ball or pin to enter and acts to guide the ball and pins into engagement with a rotatable conveyor and sorter wheel 60 which is rotatable about an axis extending longitudinally of said pit, said wheel having a diameter only slightly less than the width of said pit and having about its periphery a plurality of recesses 61 and a plurality of paddle members 62 for engaging said ball and pins. As shown in Fig. 7 the track 58 is curved to be concentric with the wheel, and as the wheel rotates in a counterclockwise direction (as the parts appear in Fig. 7) the ball is picked up in one of the recesses 61, and the pins are picked up one by one by engagement with the paddle members 62 and are elevated above the pit.

Means are provided for causing said ball to be removed from said wheel after a portion of a cycle of rotation of said wheel without removing the pins carried by the wheel, this means comprising a ball roll-off track 67 and a pivotal extension 63 of the track 58. This extension is pivoted at 90 (Fig. 6) and is pushed outwardly (to the right in Fig. 6) as the ball moves up along the roll-off track 67, and the extension 63 falls back beneath the ball, a horizontal portion 63a providing a support for the ball as it rolls from the track 67 over a sloping platform 64a and onto a ball return track 64 which carries it back to the player's end of the alley. Guide members 63b and 63c prevent the ball from falling back into the pit as it moves from the sorter wheel to the return track 64.

Figure 3:
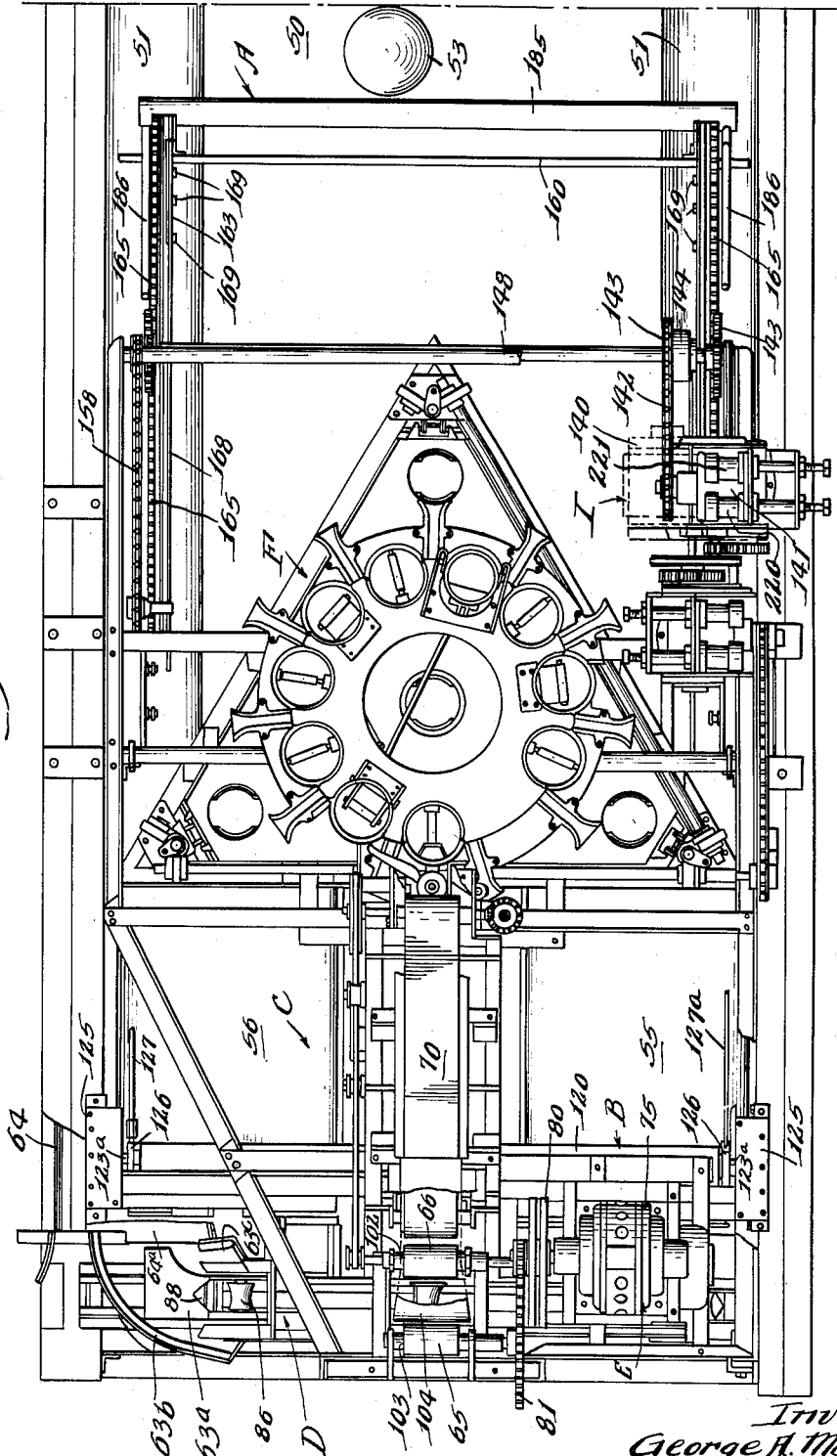
Fig. 3 is a plan view of the machine shown in Fig. 1.
Figure 4:
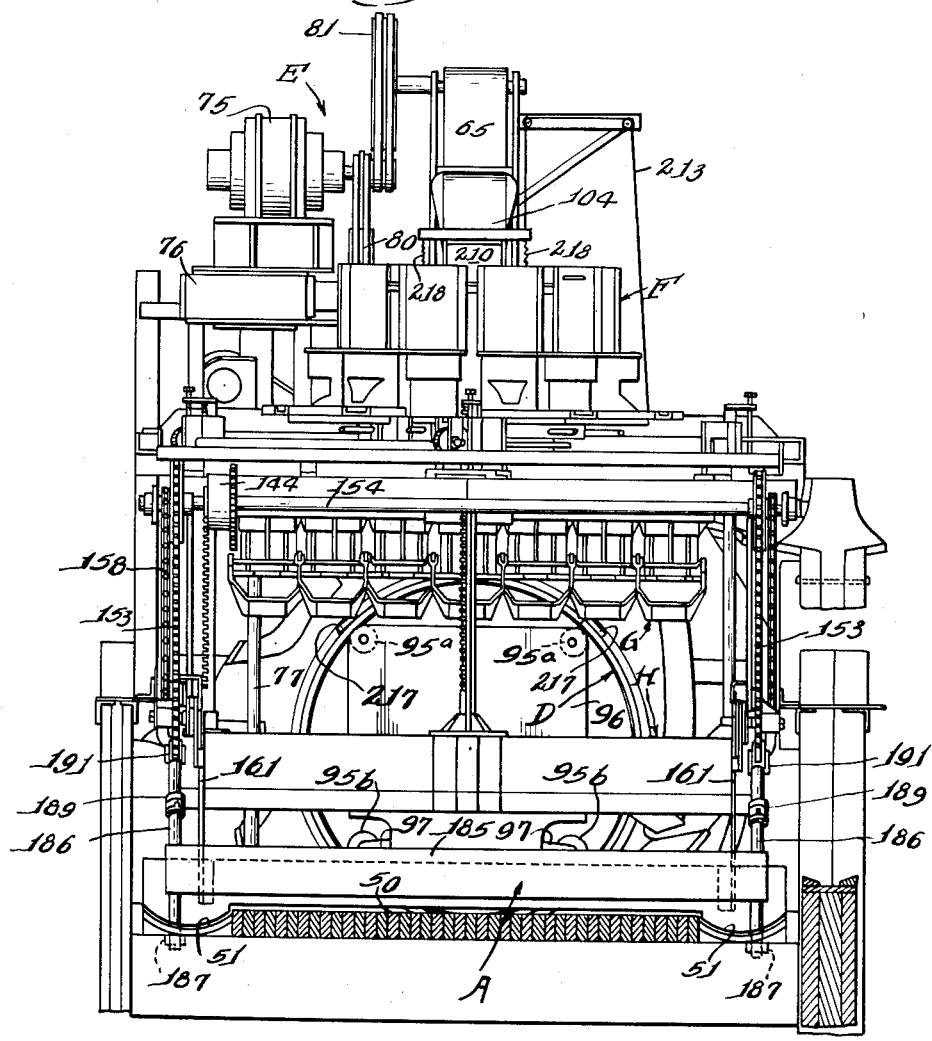
Fig. 4 is a front elevation of the machine shown in Fig. 1.

The two rails of the track 67 are spaced apart a distance greater than the width of a pin and less than the diameter of a ball to allow the pins to pass between said rails, while the ball is carried up by said rails. The pins are carried to a position adjacent the top of the wheel where they are engaged between two vertically traveling belts 65 and 66 (Fig. 3) and are elevated to a further point above the alley and delivered butt end first to a transverse or crossover conveyor comprising an endless belt 70. This belt carries the pins to a position above the alley bed and deposits them in the rotary magazine F. When the magazine F is loaded with a full complement of 10 pins and when the pin setting mechanism G is empty and is in a position to receive pins, the pins are delivered from the magazine F to the pin setting mechanism, and at the completion of a bowling frame the pin setting mechanism is lowered down through the pickup structure and sets a new group of pins on the pin deck.

*Rotary sorter*

The rotary sorter wheel is shown in Figs. 1, 2, 6 and 7. The sorter is driven by an electric motor 75, this motor providing power for the pit floor conveyor C, the rotary sorter 60, the upending belts 65 and 66, the crossover belt 70, and an indexing mechanism for the magazine F. A transmission assembly 76 transmits power to the pit floor conveyor through shafting 77, and power from the transmission assembly is delivered to the rotary conveyor through a pulley 78 and a belt 79. The main shafting of the transmission assembly 76, which is driven by a pulley 80, is connected with the crossover belt 70 which in turn connects with the indexing mechanism for the magazine F, and another pulley 81 drives the vertical belts 65 and 66. In the operation of the machine the motor 75 and the mechanisms driven thereby operate continuously.

The rotary sorter comprises a wheel rim made up of two side panels 82a and 82b, these panels being spaced apart about one and one-half inches so that as the pins are carried around to the top of the wheel they can lie on the rim, being supported by said panels. The belt 79 is trained about a pulley 83 which is shown in cross section in Figs. 1 and 5, said pulley being secured to the side panel 82a to cause the wheel to rotate. As shown best in Figs. 6 and 7, there are 8 recesses 61 in the outer edge of the wheel rim to provide pockets to carry the ball and pins, and at the rear or trailing edge of each recess a paddle member 62 extends radially outward from said rim. As the wheel rotates (counterclockwise in Figs. 6 and 7) the ball is engaged in one of the recesses and the pins are engaged by the paddle members adjacent other recesses, and the ball and pins are elevated above the pit, being held in engagement with the wheel by the track 58.

To elevate the ball to its return track without sliding it between the wheel and the track 58, each of the paddle members 62 is provided with a roller 86 supported between the opposite side members of the paddle on an axle pin 86a. Only one pin or one ball can be held by each of the paddles and recesses, and consequently, as the wheel rotates, the pins are spread out or "de-bunched" and the ball is separated from the pins.

Figs. 9 and 10 show the details of the preferred paddle construction. As pointed out earlier, the roller 86 carries the ball and allows it to roll rather than slide along between the wheel and the track 58. The surface of the roller is concave as shown in Fig. 9 to prevent the ball from rolling off. A cross bar 87 extends between the opposite walls of each paddle and is positioned to engage the butt end of a pin in the event the pin is picked up by the wheel in such position, and a member 88 extends outwardly beyond the outer end of the paddle walls in position to engage the head end of the pin should the pin be picked up with its butt end facing in the direction of rotation of the wheel.

As the rotation of the sorter wheel carries the pins upwardly around the track 58, said pins, being smaller in diameter than the ball, are carried between the ball roll-off tracks 67 and up to a position adjacent the top of the wheel where they are engaged by the belts 65 and 66 and lifted off the wheel. The ball is rolled along the track 58 until it is engaged by the members 67 which are located one on each side of the wheel and spaced far enough apart so that the pins can pass freely between them but the ball cannot. As the ball continues upward, the pivoted member 63 is moved back, and as the ball is elevated above the level of this member, the member falls back under the ball, the portion 63a of the member 63 providing a rolling surface along which the ball rolls guided by rails 63b and 63c to the ball return track 64. A sloping board is provided on each side of the return track 64 so that if two balls are returned to the track simultaneously by pin setting machines in adjacent alleys the balls will be prevented from jamming in the track. One of these boards 64a is shown in Fig. 7.

Preferably the rotary conveyor 60 is made in right and left-hand models so that the machines can be installed in pairs on adjacent alleys, the two conveyors delivering the ball to the same return track and thus permitting the use of one common ball return track without necessitating changes in any other part of the machine. The rotary conveyor 60 is internally supported by means of an upper pair of rollers 95a and a lower pair of rollers 95b, both pairs of rollers being mounted on a bracket 96 which is attached to the machine frame. The upper rollers 95a are stationary with respect to the bracket 96, while the two lower rollers 95b are each mounted on a yoke 97, each yoke having a right angular extension 97a. Each yoke is pivotally jointed to the bracket 96 and the end of each extension 97a is pivotally connected to a guide pin 98. The guide pins are slidable in brackets 99 which are fixedly mounted on the bracket 96, and a compression spring 100 surrounds each guide pin 98, each spring abutting at one end against one of the brackets 99, and abutting at the other end against a collar 101 carried by the guide pin. By this means the two lower rollers 95b are spring loaded and maintain a constant pressure on the wheel rim, thus preventing misalignment of the wheel.

*Vertical pin elevator*

The vertical pin elevator comprises the two spaced belts 65 and 66 as shown in Fig. 11. These belts extend downwardly to a point opposite the top of the rotary conveyor 60 and are spaced apart a distance less than the widest diameter of a bowling pin. The shorter belt 66 is trained over a pulley 102 which is driven clockwise as the parts appear in Fig. 11, and the belt 65 is trained over a pulley 103, this pulley being driven counterclockwise. Thus, the inner run of the two belts travels upwardly and as the rotary conveyor 60 carries a pin between these belts, the pin is gripped and lifted from the wheel and carried up between the two belts. A roller 66a within the belt 66 assists the belt in obtaining a firm grip on the pin, and a roller 65a within the belt 65 assists in discharging the pin. Obviously, since the pin is grasped by the belts only at the largest point or belly of the pin and this point is below the center of gravity of the pin, the pin hangs upside down as it travels upwardly between the belts. When the bowling pin passes the pulley 102, it is diverted by a hood 104 and the pin is caused to fall onto the transverse or crossover belt 70, the butt end of the pin leading. The crossover belt 70 carries the pins across the pit to a position above the rear of the pin deck and delivers the pins to the rotary magazine F.

It sometimes happens that pins are spaced too closely together to allow the rotary magazine F time to complete its required indexing operation so that the magazine is not ready to receive the next pin when it is delivered by the crossover belt 70. This condition occurs when the rotary sorter wheel delivers consecutive pins to the vertical pin elevator, with their butt ends in opposite directions. A pin which is delivered butt end first will be lifted from the sorter wheel quicker than one delivered top end first; therefore the even spacing attained by the rotary sorter wheel is lost as the pins are lifted from the top of the wheel. In order to correct this situation I provide a shutter which is operable to space the pins the required distance apart as the pins leave the hood 104 to travel along the crossover belt 70 so that the magazine F has sufficient time between the arrival of successive pins to complete its indexing operation.

A shutter 210 is mounted on the hood 104, said shutter extending across and blocking the exit opening of said hood and being pivotal to an out of the way position. The shutter has a pair of rearwardly extending oppositely disposed lever arms 211 (see Fig. 1) which are pivoted on the hood at 212, one of these arms being secured to a cable 213 which passes over idler sheaves and is secured to one end of an actuating arm 214 (Figs. 6 and 7). The arm 214 is pivoted on a stationary part of the machine, Figs. 6 and 7 showing the arm 214 being pivotally mounted intermediate its ends on a pin 215 on a bracket extending from one rail of the ball guiding track 67. The other end of the arm 214 terminates adjacent the sorter wheel 60 and carries a cam roller 216 which is adapted to engage a plurality of cam blocks 217 equally spaced around the periphery of the sorter wheel 60.

As the wheel 60 rotates, the cam blocks 217 successively engage the roller 216, causing the arm 214 to pivot about the pin 215 and pull on the cable 213. This raises the shutter 210 away from the hood exit opening and allows a pin to pass from the hood 104. When the cam block 217 passes the roller 216, the cable slacks and springs 218 return the shutter 210 to blocking position in front of the hood exit opening where it is in position to block a pin from leaving the hood until the roller 216 contacts the next cam block.

Swinging pit cushion

As appears in the earlier part of this description, the swinging pit cushion B is mounted for vertical movement, said cushion normally extending substantially entirely across the pit in the path of the ball and pins on the conveyor C, and being elevated in operation a sufficient distance to allow the ball and pins to pass therebeneath.

Figure 5:
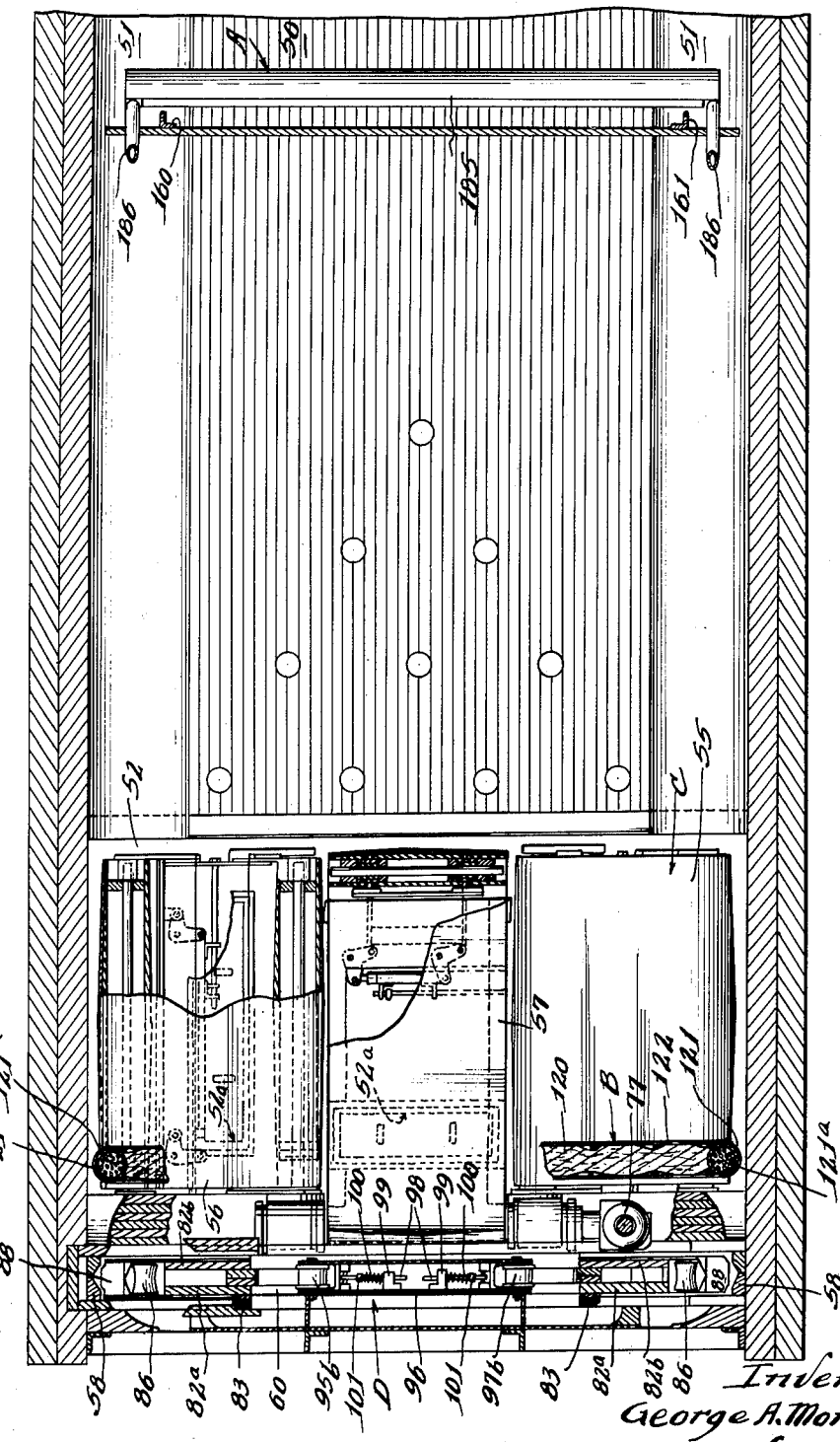
Fig. 5 is a longitudinal section along the line 5—5 of Fig. 1 with part of the pit cushion and the pit conveyor broken away to show underlying structure.

The cushion is shown in cross section in Figs. 1, 2 and 5 and in perspective in Fig. 12. Said cushion comprises a generally rectangular body portion 120 having a bottom 120a, two opposite sides 120b and 120c, and a top 120d. The body portion is firmly packed with stuffing material, and a resilient tube 121 is secured to the body portion, said tube extending in one piece around the edges of the two opposite sides and the bottom of the body portion and extending in a separate piece across the top of the body portion. In order to give the cushion weight, that portion of the tube which extends across the bottom of the body portion and part way up each side is filled with suitable heavy material, as for example shot designated at 121a. The entire unit is enclosed in a fabric casing 122, and this casing has a flat 122a extending from the top thereof for suspending the cushion for vertical movement. As shown in Figs. 1, 2 and 12, the flap 122a is secured to a roller 123. This roller is non-rotatably mounted on a shaft 123a which has a pair of gears 123b pinned thereto, said gears being adapted to be driven by a pair of racks 124 located on opposite sides of the alley. The racks are carried in brackets 125 mounted on the frame of the machine, these brackets being slotted at 125a for the reception of the ends of the shaft 123a. Adjacent each of the brackets 125 a collar 126 (see Fig. 3) is rotatably mounted on the shaft 123a, and to each of these collars is affixed one end of one of the cables 127 and 127a. As shown in Figs. 1 and 2, each of these cables is trained over a sheave 128 and the other end of the cable is secured to one of the raising and lowering arms of the guard. Consequently, when the guard is lowered after each ball is rolled, the cables 127 and 127a are pulled, causing the gears 123b to move forwardly along the racks 124, turning the shaft 123a and winding the flap 122a on the roller 123 so that the cushion is elevated to permit the ball and pins to pass therebeneath. At the end of the sweeping operation when the guard and sweep are raised to their inoperative position, the weight of the cushion causes the flap 122a to unwind from the roller 123 so that the cushion is lowered and the gears 123b move to the rear end of the racks 124. This mechanism not only insures the raising of the cushion after the rolling of each ball, but also results in a construction wherein the cushion and the guard-sweep mechanism act as counterweights for each other.

Sweep and guard

As appears from the early portion of this description and from Fig. 2, the sweep and guard are normally carried in a rest position above the alley bed, and after the rolling of each ball the sweep and guard are lowered to the alley bed as shown in Fig. 1 and at the proper time the sweep is moved rearwardly to the rear of the alley bed, sweeping pins into the pit. Power for these operations is derived from a motor 140 and a transmission mechanism 141 which includes means for reducing the drive speed, as for example from 1750 R. P. M. to 175 R. P. M. The transmission mechanism includes a double acting clutch which is operated by two solenoids 220 and 221. This arrangement provides up and down motion for the guard and sweep and horizontal rearward and forward motion for the sweep, power to drive the guard and sweep being delivered from the gear mechanism 141 to the sweep by means of a chain 142.

The mechanism driven by this chain is shown in Figs. 13 and 14. The chain engages a sprocket 143 carried by a gear case 144. Inside the gear case is a planetary gear assembly comprising an outer ring gear 145 which is driven by the chain driven sprocket 143. Inside of the ring gear 145 are three small planetry gears 146a, 146b and 146c which are attached to planetary spiders 147 on an outer tubular shaft 148. On opposite outer ends of this shaft are pinions 150 equipped with rack attachment rollers 151 pivotally attached by side plates 152. These pinions engage racks 153 forming rigid motion-transmitting members which are connected with the guard.

An inner shaft 154 is supported on the frame structure of the machine and extends transversely across the alley within the outer tubular shaft 148. The shaft 154 is interconnected with the three planetry gears 146 by means of a pinion 155. Near each end of shaft 154 and positioned between pinions 150 and bearings 156 are two sprockets 157 which are interconnected with the sweep mechanism by means of chains 158.

Operation

In the operation of the machine, in order to lower the guard and sweep, a solenoid (as the solenoid 220) associated with the transmission assembly 141 is energized, and power is delivered to the planetary gear assembly through the chain 142 and the sprocket 143 to rotate the ring gear 145 in one direction. When the sweep and guard are up the sweep is locked so that it cannot be moved away from the guard and the inner shaft 154 is locked against rotation so that the planetary gears 146a, 146b and 146c are caused to rotate about the pinion 155. This causes the outer tubular shaft 148 to rotate, turning the pinions 150, and the racks 153 move along the pinions 150, lowering the sweep and guard. When the guard strikes the alley bed, the sweep becomes unlocked from the guard, and the guard is blocked from further downward movement. Consequently, the planetary gears 146a, 146b and 146c cease their rotation about the pinion 155, and the continued rotation of the ring gear 145 causes the pinion 155 to turn, turning the inner shaft 154 and delivering power to the sweep through the sprockets 157 and the chains 158.

The sweep moves toward the rear of the alley, and when it reaches the end of its travel, solenoid 220 is de-energized and the other solenoid 221 is energized by means of the operation of switches (not shown), causing a reversal in the direction of the power delivered from the transmission mechanism 141. This reverses the direction of the sweep and moves it back to its front position where it is stopped when it engages the guard, and power is transferred from the sweep to the guard in the reverse of the manner just described, and the guard is lifted to its rest position carrying the sweep with it.

The sweep and guard assembly are shown in Fig. 15. The sweep comprises a board 160 which is supported transversely across the alley by a pair of vertical arms 161 on opposite sides of the alley. At their upper ends the arms 161 are pivotally and slidably attached to roller brackets 162, this connection being made by means of a pivot pin 162a mounted on each bracket and extending through a slot 161a in each of the arms 161. These arms are pivotally and slidably connected to the roller brackets 162 in order to allow the sweep to pivot and stop in its downward movement in the event the sweep should come down on top of a pin lying on the alley or in the gutter, and thereby preventing a jam which might cause damage to the machine. The sweep is prevented from pivoting toward the player's end of the alley by a lug 162b formed on the plate 162. Since the roller brackets 162 and associated mechanisms are identical on opposite sides of the alley, only one will be described in detail.

The roller brackets 162 engage a movable track 163 by means of rollers 164, and the sweep track 163 carries a rack 165 which is slidably mounted on rollers. At its ends the track 163 carries a sheave 166 and a sheave 167 about which is trained a cable 168. The cable is attached to roller bracket 162 by means of blocks 169 mounted on said bracket, and said cable is also secured to a stationary bracket 170 (see Fig. 17). In operation of the sweep the entire track 163 is caused to move to the left (toward the rear of the alley) and the roller bracket 162 is caused to move relative to the track by the pull of the cable 168 so that the bracket 162 moves twice as fast and twice as far as the track 163. By this arrangement of moving the track 163 it is possible to shorten the required length of the track as compared with a stationary track so that the entire track can be pivoted to an out of the way position, as shown in Figs. 2 and 15, to allow easy alley maintenance. Furthermore, this arrangement requires no cross members at the front of the machine which might interfere with cleaning the alleys or servicing the machine, and the motion multiplying system disclosed herewith shortens the required length of the machine structure.

Referring again to Fig. 15, a supporting bar 171 is rigidly bolted to the machine frame, and along the lower edge of said bar are placed six stationary rollers 172a, 172b, 172c, 172d, 172e and 172f in co-linear arrangement. These rollers supply a rolling surface for the rack 165 carried by the sweep track 163. A bearing bracket 173 is mounted on the supporting bar 171, this bracket providing support for a stub shaft 174, upon which are rigidly mounted a pinion 175 and a sprocket 176. A roller bracket 177 is pivotally supported about the outer surface of the hub of bearing bracket 173, this roller bracket having two rollers 178a and 178b at its lower edge to support the rack 165 and to hold it in mesh with the pinion 175. Since the roller bracket 177 is free to rotate about the hub of the bearing bracket 173, the rack 165 is held in mesh while at the same time the sweep track 163 and the rack 165 may be pivoted so that their front end is lifted as the sweep and guard rise. A block 180 is secured to the bar 171 to the rear of the bracket 173 so that as the sweep track is pivoted, the rear end of the rack 165 will slide along the curved portion 180a of said block and will lock the sweep and prevent the sweep from rolling rearwardly along its track as it is being raised. A portion 177a of the roller bracket 177 is extended up and over the sweep track to provide an anchor for the cable block 170 (see Fig. 16).

As shown in Fig. 15, the chain which engages the sprocket 157 at its forward end to provide power for the sweep engages the sprocket 176 at its rear end, so consequently the sweep will be driven rearwardly when it is unlocked from the guard (i. e. when said rack is in a horizontal position), and at the end of its rearward movement upon reversal of the direction of the power said sweep will be driven forwardly until such time as it is blocked by the guard. In operation, when the sweep is lowered the rack 165 comes to rest on the rollers 172d, 172e and 172f. As the sweep track clears the bracket 180 the sweep is unlocked from the guard and the planetary gear assembly transfers power from the guard to the sweep, causing the chain 158 to turn the sprocket 176 and the pinion 175, thus moving the rack 165 to the left so that said rack is now supported by the rollers 172a, 172b and 172c. As the rack travels, the sweep travels twice the distance as above described.

The guard consists of a padded member 185 which is supported transversely across the alley by pivoted arms 186 on opposite sides of the alley, these arms being pivotally attached at their rear ends to the bars 171. As shown in Fig. 15, there are sockets 187 in each of the gutters. These sockets engage and hold the lower ends of the arms 186 and thus absorb part of the shock caused by the impact of a ball against the guard. By this construction it is possible to build this portion of the machine of lighter material and still provide strength enough to withstand the great shock developed at the impact of a fast-rolling 16-pound ball. Near the front end of each of the arms 186 there is a joint comprising a pivot connection 188 and a partially cut out sleeve 189, this connection allowing the lower end of the arms 186 to pivot upwardly only, thereby preventing a jam in the machine in the event a pin rests under the guard as it is lowered to the alley. Stop blocks 190 at the upper ends of the racks 153 engageable with side plates 152 prevent the guard from going down too far.

At an intermediate point along the arms 186 the racks 153 are attached by means of brackets 191. As pointed out earlier, these racks extend upwardly and engage pinions 150 on the planetary gear tubular shaft 148, this engagement being maintained by brackets 152 and rollers 151. At a point slightly above the bracket 191, a roller 192 is attached to each rack 153, this roller engaging the sweep track 163 to lift the sweep track to its tilted upper position so that as the rack 153 is driven up and down by the driving pinion 150 the guard and sweep are raised and lowered and the entire sweep track pivots to a rest position as shown in Fig. 2 and in dotted lines in Fig. 15. The cables 127 and 127a which operate the pit cushion B are respectively secured to a cable clevis 193 which is mounted on each of the arms 186 to the rear of the bracket 191. This interconnection between the guard-sweep and the pit cushion allows each of these mechanisms to act as a counterbalance for the other.

Figs. 20, 21 and 22 show a modified construction for the sweep. This construction is designed to be used when two or three bowling alleys are installed so closely together that ball return track is not disposed laterally of the gutter but overlies the gutter. In this situation there is not sufficient space for the ball to return to the players' end of the alley without striking the sweep board as the sweep is being raised and lowered. Obviously, the sweep board must be long enough to prevent pins from passing around the ends or from jamming at the ends thereof. Also it will be obvious that there must be sufficient space between the ends of the sweep boards on two adjacent alleys to allow passage of the ball between the sweep boards. Otherwise the ball would have to be carried up above the high rest position of the sweep boards.

In order to provide for this contingency the end of the sweep board 160 is hinged so that the outer end 160a of the board can swing toward the pit end of the alley but cannot swing toward the players' end of the alley. Accordingly a hinge 194 is mounted on the sweep board 160 and the hinge pin 194a is affixed to that portion of the hinge that is mounted on the free or pivotal end 160a of the sweep board 160. A flexible shafting comprising a telescoping rod 195 is mounted at one end on said hinge pin by means of a universal joint 196. This rod extends upwardly and is connected by means of another universal joint 197 to a toggle cam 199 which is pivoted on a bracket 198 which is attached to the sweep carriage bracket 162. The telescoping rod and the universal joints are desirable in order to provide a flexible connection in the event the sweep tilts, as it might if it descended on a pin or in some other manner got out of alignment. The toggle cam 199 is rigidly attached to the upper end of the flexible shafting, and a pin 200 is placed in the top of the bracket 198 to limit the pivotal action of the cam 199. A bracket 201 is attached to the sweep track and holds a pin 202 rigidly and in a proper position to engage the toggle cam as it passes. An off-center spring 203 is associated with this apparatus to hold the unit in a fixed position, either extended across the alley or folded. Since the carriage bracket 162 travels twice as fast as the sweep track 163, the bracket 199 overtakes and travels past the pin 202 shortly after the sweep starts its rearward travel and again shortly before the sweep completes its forward travel, and the bracket 199 pivots 90° each time it is engaged by the pin 202. With this arrangement, as the sweep starts its travel along the alley, the outer end 160a of the sweep board 160 is extended, and as the sweep returns to its forward position the outer end of the sweep board is folded.

I claim:

1. In a pin setting machine for use with an alley bed, apparatus comprising, a guard member normally positioned above said alley bed and vertically movable to a position adjacent the surface of the alley bed and transverse thereto in the path of a rolled ball for preventing balls from striking machine mechanisms during an operating cycle of the machine, a sweep member mounted independently of said guard member extending transversely of said alley bed and normally positioned above said alley bed, said sweep member being vertically movable to a position adjacent said alley bed and horizontally movable along said alley bed to the rear thereof, a member carried by said guard and operable to engage said sweep to cause said sweep to be carried upwardly by said guard in said vertical path, a single power source for moving said guard member in said vertical path and for moving said sweep member in said horizontal path, means connecting said power source alternately to said guard member and to said sweep member to obtain said vertical and horizontal movement in sequential manner, said last mentioned means comprising a planetary gear assembly having one element thereof drivingly connected to said sweep member to drive said sweep member in a horizontal direction and another element drivingly connected to said guard member to drive said guard member in a vertical direction when said sweep member is locked against movement, and means for locking the sweep against movement relative to the guard when the guard and sweep are normally positioned above the alley bed and when the sweep moves into position behind the guard after moving from the rear of the alley bed.

2. In a pin setting machine for use with an alley bed, a pivotally mounted guard member normally positioned above said alley bed and vertically movable to a position adjacent the surface of the alley bed and transverse thereto in the path of a rolled ball for preventing balls from striking machine mechanisms during an operating cycle of the machine, a pivotally mounted sweep member extending transversely of said alley bed and normally positioned above said alley bed, a tiltable track along which said sweep member may travel horizontally and which carries the sweep member for vertical movement, said sweep member being mounted for vertical movement with said track to a position adjacent said alley bed and for horizontal movement along said alley bed to the rear thereof, automatically releasable means for securing said sweep member against movement along said track when said sweep is in its raised position and releasable by movement of the sweep to its position adjacent the alley bed for permitting movement of said sweep along said track, a member carried by said guard and operable to engage said track to cause said sweep to be carried by said guard in said vertical path, a single power source for moving said guard member in said vertical path and for moving said sweep member in said horizontal path, and means connecting said power source first to said guard member and then to said sweep member to obtain said vertical and horizontal movement in sequential manner, said last mentioned means comprising a planetary gear assembly having one element thereof drivingly connected to said sweep member to drive said sweep member in a horizontal direction and another element drivingly connected to said guard and effective in response to securing of said sweep member against movement along said track to drive said guard in a vertical direction.

3. In a pin setting machine for use with an alley bed having gutters associated therewith, a sweep member normally positioned above said alley bed and mounted for vertical movement to a position adjacent the alley bed and horizontal movement along said alley bed, said sweep member having hinged end portions pivoted about vertical axes, said sweep member and its hinged end portions extending substantially transversely across said alley bed and gutters during at least the greater portion of said horizontal movement, said hinged portions extending substantially longitudinally of said alley bed when said member is in its normal elevated position and during the vertical movement thereof, a power source for moving said member in said vertical and horizontal paths, and means responsive to the horizontal movement of said member for first pivoting said hinged portions to their transverse position and subsequently pivoting said hinged portions to their positions longitudinally of the alley bed prior to return of said member to its elevated position.

4. In a pin setting machine for use with an alley bed having gutters associated therewith, a sweep member having hinged end portions pivoted about vertical axes for movement between an operating position wherein said portions extend transversely of the alley bed and an inoperative position, said sweep member and its hinged end portions when in operating position extending substantially across said alley bed and gutters, a track along which said sweep member runs, a cam operatively associated with each hinged end portion of said sweep member, and cam actuating members carried by said track positioned for engagement with said cams upon relative movement between the track and sweep member, means for moving said sweep member along said track in opposite directions, movement of said sweep member along said track in opposite directions effecting engagement of said cam members and said cam actuating members to pivot said hinged end portions into and out of operating position.

5. In a pin setting machine having a framework and for use on an alley bed, a pivotally mounted guard member normally positioned above said alley bed and vertically movable to a position adjacent the surface of the alley bed and transverse thereto in the path of a rolled ball for preventing balls from striking machine mechanisms during an operating cycle of the machine, a track pivotally mounted on said framework for vertical movement between an elevated inoperative position and a lower operative position adjacent the alley bed, means carried by the framework supporting said track for linear movement with respect to the framework, a pivotally mounted sweep member extending transversely of said alley bed and normally positioned above the alley bed, said sweep member being mounted on said track for vertical movement therewith to a position adjacent the alley bed and for horizontal movement along said track, means responsive to the linear movement of the track to move said sweep member along the track, automatically releasable means for securing said track against linear movement along said track supporting means when said track is in its elevated inoperative position and releasable upon movement of the track to its lower operative position for permitting linear movement of the track, a member carried by said guard and operable to engage said track to cause upward vertical movement of said track and sweep by said guard, a single power source for moving said guard member in said vertical path and for moving said track linearly along said track supporting means, and means connecting said power source first to said guard member and then to said track to obtain said vertical and linear movements in sequential manner.

6. In a pinsetting machine for use with an alley bed having a pit at the rear thereof, a machine frame, a pair of arms pivotally connected to the frame and extending forwardly therefrom, a guard member mounted at the forward end of said arms for up and down movement therewith between a position above the alley bed and a position on the alley bed in the path of a rolled ball for preventing balls from striking the machine mechanisms during the operating cycle of the machine, a pit cushion suspended in the pit and extending transversely across the pit in the path of a ball, means mounting the pit cushion for up and down movement to permit movement of a ball therebeyond, and means connecting the guard member and pit cushion for counterbalancing movement including elongated members interconnecting the arms with the pit cushion.

7. In a pinsetting machine for use with an alley bed having a pit at the rear thereof, a frame, a pair of arms pivotally mounted on and extending forwardly from the frame, sweep and guard means mounted on said arms for up and down movement therewith between a position above the alley bed and a position on the alley bed, a wind-up roller mounted on the frame above the pit for rotation and linear movement, a pit cushion suspended from said roller and normally extending transversely across said pit so as to block a ball entering the pit, means for rotating the roller in response to linear movement thereof, and means for causing counterbalancing movement between the sweep and guard means and the pit cushion including cables connected between the roller and said pair of arms to cause linear movement of the roller and raising of the pit cushion when the sweep and guard means descends and reverse movement of the roller and lowering of the pit cushion when the sweep and guard means is raised.

References Cited in the file of this patent

UNITED STATES PATENTS

| | | |
|---|---|---|
| 1,203,216 | McFarland | Oct. 31, 1916 |
| 1,468,212 | Redfield | Sept. 18, 1923 |
| 1,542,804 | Gray | June 16, 1925 |
| 1,557,177 | Lorenz et al. | Oct. 13, 1925 |
| 1,590,124 | Roble | June 22, 1926 |
| 1,712,186 | White | May 7, 1929 |
| 1,806,274 | Williams | May 19, 1931 |
| 2,017,143 | Bentz | Oct. 15, 1935 |
| 2,250,503 | Rundell | July 29, 1941 |
| 2,310,218 | Davis | Feb. 9, 1943 |
| 2,316,183 | Patterson | Apr. 13, 1943 |
| 2,319,925 | Flanagan | May 25, 1943 |
| 2,341,476 | Parra et al. | Feb. 8, 1944 |
| 2,346,189 | Schmidt | Apr. 11, 1944 |
| 2,411,348 | Turner | Nov. 19, 1946 |
| 2,583,208 | Clark | Jan. 22, 1952 |